(12) United States Patent
Yang et al.

(10) Patent No.: US 10,497,124 B2
(45) Date of Patent: Dec. 3, 2019

(54) OPTIC DISC IMAGE SEGMENTATION METHOD AND APPARATUS

(71) Applicant: Kabushiki Kaisha TOPCON, Tokyo (JP)

(72) Inventors: Qi Yang, Foster City, CA (US); Charles A. Reisman, Mamaroneck, NY (US)

(73) Assignee: Kabushiki Kaisha TOPCON, Tokyo (JP)

( * ) Notice: Subject to any disclaimer, the term of this patent is extended or adjusted under 35 U.S.C. 154(b) by 102 days.

(21) Appl. No.: 14/206,078

(22) Filed: Mar. 12, 2014

(65) Prior Publication Data

US 2014/0270444 A1    Sep. 18, 2014

Related U.S. Application Data

(60) Provisional application No. 61/793,989, filed on Mar. 15, 2013.

(51) Int. Cl.
*G06T 7/12* (2017.01)
*G06T 7/00* (2017.01)

(52) U.S. Cl.
CPC .............. *G06T 7/12* (2017.01); *G06T 7/0012* (2013.01); *G06T 2207/30041* (2013.01)

(58) Field of Classification Search
CPC .... G06T 7/0081; G06T 7/0083; G06T 7/0012
See application file for complete search history.

(56) References Cited

U.S. PATENT DOCUMENTS

| 7,712,898 B2 | 5/2010 | Abramoff et al. |
| 7,744,221 B2 | 6/2010 | Wei et al. |
| 2008/0312552 A1 | 12/2008 | Zhou et al. |
| 2011/0243415 A1 | 10/2011 | Yonezawa et al. |

(Continued)

FOREIGN PATENT DOCUMENTS

| JP | 2008-206684 A | 9/2008 |
| JP | 2010-279439 A | 12/2010 |
| JP | 2014-180579 A | 9/2014 |

(Continued)

OTHER PUBLICATIONS (Qi Yang, Charles A. Reisman, Zhenguo Wang, Yasufumi Fukuma, Masanori Hangai, Nagahisa Yoshimura, Atsuo Tomidokoro, Makoto Araie, Ali S. Raza, Donald C. Hood, and Kinpui Chan, "Automated layer segmentation of macular OCT images using dual-scale gradient information," Opt. Express 18, 21293-21307 (2010)).*

(Continued)

*Primary Examiner* — Menatoallah Youssef
(74) *Attorney, Agent, or Firm* — Pearne & Gordon LLP (57) ABSTRACT

Provided is a method of processing image data and detecting a region of an image represented by the image data to be excluded from an analysis of the image. According to the method, image data captured by a medical modality is received. An evaluation of a portion of the image data representing a two-dimensional view of a subject appearing in the image is conducted to locate, in the two-dimensional view, the region to be excluded from the analysis of the image. A feature pertinent to the analysis appearing in a remaining portion of the image, that is outside of the region to be excluded from the analysis located by the evaluation, is detected.

16 Claims, 7 Drawing Sheets

(56) References Cited

U.S. PATENT DOCUMENTS

2012/0076381 A1* 3/2012 Takama ............... G06T 11/008
382/131

FOREIGN PATENT DOCUMENTS

| WO | 2003030075 A1 | 4/2003 |
|---|---|---|
| WO | 2005036457 A | 4/2005 |
| WO | 2007/084748 A2 | 7/2007 |
| WO | 2007133964 A2 | 11/2007 |
| WO | 2011/132478 A1 | 10/2011 |
| WO | 2012018303 A1 | 2/2012 |

OTHER PUBLICATIONS

Lee, Kyungmoo, et al. "Segmentation of the optic disc in 3-D OCT scans of the optic nerve head." Medical Imaging, IEEE Transactions on 29.1 (2010): 159-168.*

Kafieh, Raheleh, et al. "Intra-Retinal Layer Segmentation of 3D Optical Coherence Tomography Using Coarse Grained Diffusion Map." arXiv preprint arXiv:1210.0310 (2012).*

Qi Yang, Charles A. Reisman, Zhenguo Wang, Yasufumi Fukuma, Masanori Hangai, Nagahisa Yoshimura, Atsuo Tomidokoro, Makoto Araie, AN S. Raza, Donald C. Hood, and Kinpui Chan, "Automated layer segmentation of macular OCT images using dual-scale gradient information," Opt. Express 18, 21293-21307 (2010).*

Kafieh, Raheleh, et al. "Intra-Retinal Layer Segmentation of 3D Optical Coherence Tomography Using Coarse Grained Diffusion Map." arXiv preprint arXiv:1210.0310 (2012) (Year: 2012).*

Hu, Zhihong et. al. "Automated Segmentation of Neural Canal Opening and Optic Cup in 3D Spectral Optical Coherence Tomography Volumes of the Optic Nerve Head" IN: Investigative Opthalmology & Visual Science, Nov. 2010, vol. 51, No. 11 pp. 5708-5717.

Lee, Kyungmoo et al. "Segmentation of the Optic Disc in 3-D OCT Scans of the Optic Nerve Head" IN: National Institute of Health Public Access Author Manuscript, Jan. 2010, vol. 29 No. 1 pp. 159-168.

Abramoff, Michael D. et. al. "Automated Segmentation of the Cup and Rim from Spectral Domain OCT of the Nerve Head" IN: National Institute of Health Public Access Author Manuscript Dec. 2009, vol. 50, No. 12, pp. 5778-5784.

European Search Report for EP14159957 dated Jan. 22, 2016.

* cited by examiner

OPTIC DISC IMAGE SEGMENTATION METHOD AND APPARATUS

CROSS-REFERENCE TO RELATED APPLICATIONS

This application claims the benefit of U.S. Provisional Application No. 61/793,989, filed Mar. 15, 2013, which is incorporated in its entirety herein by reference.

BACKGROUND OF THE INVENTION

1. Field of the Invention

This application relates generally to optical diagnostic methods and apparatus and, more specifically, to a method and apparatus that identifies a feature within a region of the retina, and optionally estimates a volume of a portion of that region.

2. Description of Related Art

In ophthalmic and other applications, optical coherence tomography ("OCT") is frequently used to generate three-dimensional scan data of a volume at a location being examined. An example of such a location is the optic nerve head ("ONH"), also referred to as the optic disc, which is where ganglion cell axons, also commonly referred to as nerve fibers, come together and exit the eye to form the optic nerve. The ONH is the distal portion of the optic nerve extending from the myelinated portion of nerve that begins just behind the sclera, to the retinal surface. The optic disc is also the entry point for the major blood vessels that supply blood to the retina, so a large amount of information useful in medical diagnoses can be extracted from this location.

The structural uniqueness of such locations can offer a useful indication of the eye's health and an early indication of the onset or progression of certain conditions. For example, optic nerve damage or atrophy can be indicative of glaucoma or another serious disease of the retina causing a large amount of neural tissue to be destroyed. Similarly, swelling of the optic nerve caused by inflammatory changes in the nerve, a condition known as optic neuritis, may be a manifestation of multiple sclerosis. Detection of each of these symptoms can be facilitated through the identification of the ONH and segmentation of the layers of the retina. However, the significant structural difference of the ONH as compared to neighboring retinal areas makes layer segmentation of ONH images difficult. And the structural variations of the ONH among subjects add to the difficulty of accurately using layer segmentation to detect regions of interest, such as the ONH cutout region.

Layer segmentation performed on ONH images obtained through OCT has traditionally ignored the ONH region (segmented through the ONH region using the same algorithm and parameters). A following step is needed, if possible, to identify the location of an ONH cutout region utilizing the layer segmentation information from a full three-dimensional dataset. The segmentation results in the detected ONH cutout region are then erased and excluded from the following analysis. However, acute structural changes approaching the ONH often result in segmentation errors or deviations in one or more layer boundaries adjacent to the ONH, which are still present even with a post-processing procedure that erases segmented boundaries within the ONH after identifying the ONH cutout from the three-dimensional data.

Another approach to layer segmentation performed on ONH images has involved masking a location where the cutout region is believed to be located and then analyzing the unmasked regions. According to this approach, a mask having a suitably-large size and shape to ensure that even the largest cutout regions will be masked so the remainder of the ONH appearing in the images can be analyzed for layer segmentation purposes. However, such an arbitrary-sized mask must be large enough to conceal the cutout region of various different subjects. As a result the mask will often be too large for the subject, excluding regions of the ONH of interest from the analysis. These excluded regions can contain information that would be useful in diagnosing a condition related to the eye.

BRIEF SUMMARY OF THE INVENTION

Accordingly, there is a need in the art for a method and apparatus for analyzing a region of the eye, such as the ONH for example, utilizing two-dimensional images to detect an artifact that could detrimentally affect the analysis.

According to one aspect, the subject application involves a method of processing image data and detecting a region of an image represented by the image data to be excluded from an analysis of the image. Image data captured by a medical modality is received, and an evaluation of a portion of the image data representing a two-dimensional view of a subject appearing in the image is conducted to locate, in the two-dimensional view, the region to be excluded from the analysis of the image. A feature pertinent to the analysis appearing in a remaining portion of the image, that is outside of the region to be excluded from the analysis located during the evaluation, is also detected.

According to another aspect, the subject application involves a method of processing image data pertaining to an ocular image captured by a medical modality. The method includes using a computer to analyze the image data and identify a location of an optic nerve head region within the ocular image. The location of the optic nerve head region is distinguished from a first region and a second region of an eye appearing in the ocular image adjacent to the location of the optic nerve head region, wherein the first and second regions are separated from each other in the ocular image by the optic nerve head region. A segmentation analysis of the image data corresponding to the first region and the second region is conducted separately from the image data corresponding to the optic nerve head region to locate a plurality of boundaries that each separates a plurality of tissue layers within the first and second regions of the eye. Separate from conducting the segmentation analysis of the image data corresponding to the first and second regions, an analysis of the image data corresponding to the optic nerve head region can also optionally be conducted. A thickness of each of the plurality of tissue layers within the first and second regions based on a location of the plurality of boundaries determined during the segmentation analysis is also determined.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Figure 1:
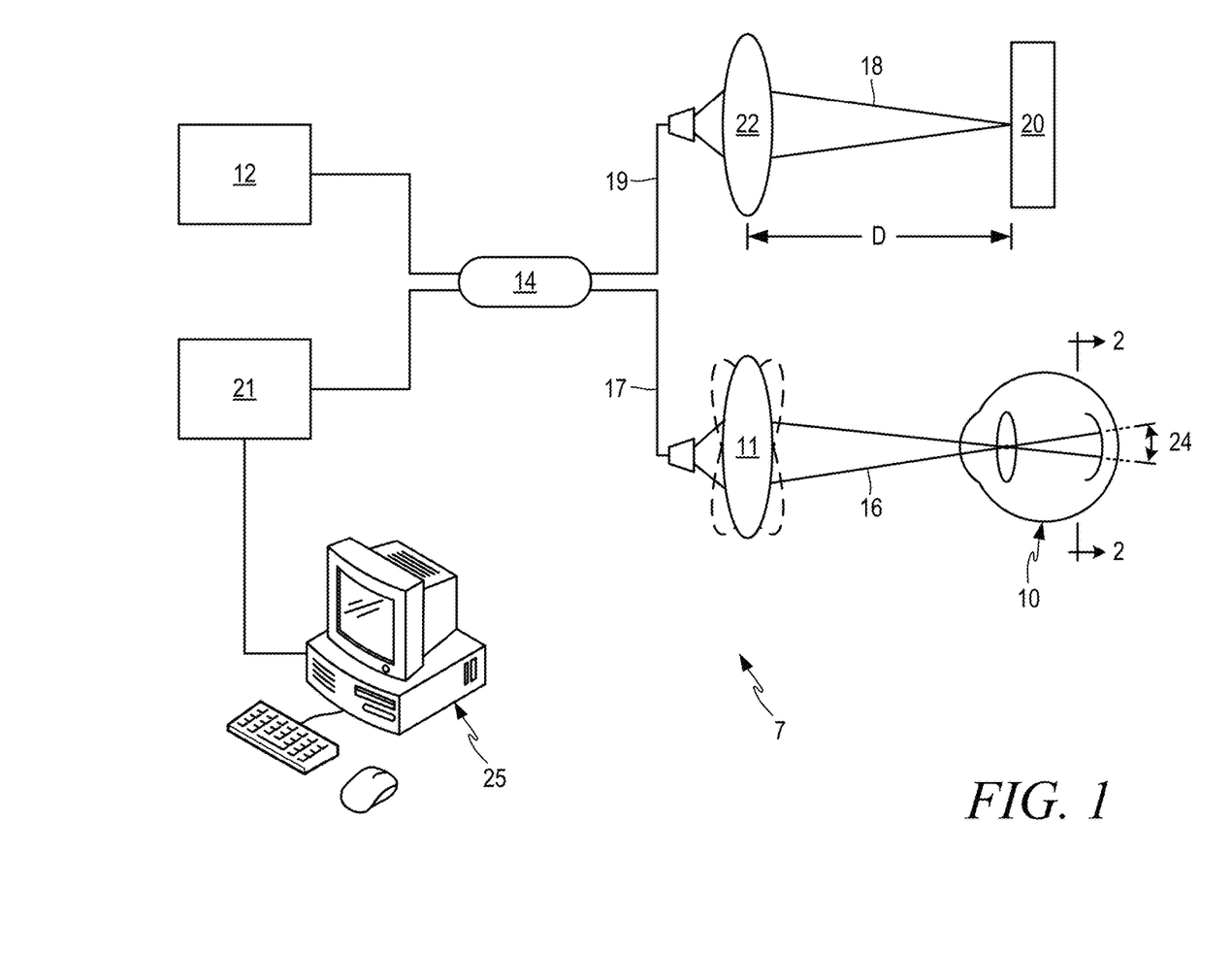
FIG. 1 shows an illustrative embodiment of an OCT system for measuring a quality of an eye.

FIG. 1 shows an illustrative embodiment of a system 7 for performing a test on a subject as part of a medical examination. As shown, the system 7 is an optical coherence tomography ("OCT") system that performs an imaging technique used in ophthalmology to generate cross-sectional images of portions of the eye 10, such as the retina (or more specifically, the nerve fiber layer, ganglion cell layer ("GCL"), ganglion cell plus inner plexiform layer (GCL+), optic nerve head ("ONH"), and nerve fiber layer plus ganglion cell layer plus inner plexiform layer (a.k.a., ganglion cell complex or GCC), for example. These portions of the eye 10 do not form an exhaustive list of the portions that could be analyzed as described herein as regions of interest. For example, outer retinal layers could also be of interest. Alternate embodiments could include the identification and/or segmentation of regions of the eye 10 other than the retina, or including the retina in combination with another portion of the eye 10 for example. Specific examples of such other regions include, but are not limited to, the Lamina Cribrosa within the ONH, and the choroid. Although the present disclosure uses the OCT system to collect image data representing the ONH as an illustrative example of the system 7 for the sake of clearly describing the subject method and apparatus, it is to be understood that the present disclosure is not so limited. The system 7 can include any imagining or other such diagnostic apparatus that generates data relating to different spatial locations of a subject as part of a medical examination. For example, the system 7 can include a computer axial tomography ("CT") modality, a magnetic resonance imaging ("MRI") modality, an ultrasound modality, etc. . . . to capture data concerning different portions of a subject's body, such as internal organs, muscles, nerves, blood vessels, bones, etc. . . . without departing from the scope of this disclosure.

Generally, OCT involves impinging light from a low-coherence broadband light source 12 onto portions of the eye 10, and observing reflected light to generate a cross-sectional image of those portions of the eye 10. Light from the light source 12 is split by an optical adaptor 14 such as a beam splitter, fiber coupler or the like, into two portions: a sample portion 16 that travels along a path 17 toward the eye 10, and a reference portion 18 that travels along a path 19 toward a reference reflector such as a mirror 20. The sample portion 16 and the reference portion 18 are at least partially reflected, and the reflected portions combined by the optical adaptor 14 and the intensity or other quality (e.g., wavelength, fraction of light reflected, etc. . . . ) of the combined, reflected light is sensed by a detector 21 operatively connected to transmit a signal indicative of the sensed quality to be received by a computer 25. When the distance traveled by the sample portion 16 is within a coherence length of the distance traveled by the reference portion 18, an optical interference pattern is created, affecting the intensity of the reflected and combined light. The intensity of the combined, reflected light varies depending upon the properties (e.g., tissue backscattering, polarization, etc. . . . ) of the portions of the eye 10 that are illuminated by the sample portion 16. Information about such properties of the illuminated portion of the eye 10 can then be determined based on the intensity of the combined, reflected light, and used to generate image data representing, or otherwise pertaining to, that illuminated portion of the eye 10.

The depth to which the sample portion 16 penetrates the eye 10 can be controlled in the time domain by varying a distance D separating a transmitter 22 of the reference portion 18 from the mirror 20. Alternatively, the depth of penetration can be controlled in the frequency domain by establishing an appropriate distance D, which can be fixed or variable to counterbalance saccadic eye movements, eye shape, or other potential variables that could potentially negatively impact image creation for example, and utilizing a broadband light source or alternatively sweeping (e.g., repeatedly sequentially varying the frequency over a period of time) the wavelength of the light source 12 over a range of frequencies. Conducting a Fourier analysis on the combined, reflected light relates the light reflected at different frequencies to light reflected at different depths of the eye 10.

Determining the intensity of light reflected by a spatial location of the eye 10 is referred to herein as an "A-scan". An A-scan involves detecting the intensity of reflected light corresponding to features within the eye 10 arranged in the axial direction of the sample portion 16 (FIG. 1) of light extending into the specific locations (i.e., in the depth direction of the eye 10). The information conveyed by the reflected portion of light provides an indication of the structures encountered by the sample portion 16 of light along the axial direction for that spatial location. This A-scan is repeated for other spatial locations of the eye 10, which can be another spatial location arranged along a vertical column, resulting in a two-dimensional view of a section of the portion of the eye 10 arranged along the vertical column of the A-scans. This two-dimensional, sectional view of the portion of the eye 10 is referred to herein as a "B-scan". A plurality of B-scans can also be combined as slices of the eye 10 to create a three-dimensional volume. For ophthalmic purposes, an illustrative example of the region of interest 24 for the A-scans can include a region extending from the cornea to the retina 32 (FIG. 2), and a B-scan can include a portion of the retina 32 including the ONH 38 (FIG. 2).

Image data collected during the A-scan, B-scan, or a combination thereof, can be analyzed to determine a physical dimension or other quantification of the tissue forming the region of interest 24. Referring to the example of the OCT system used in ophthalmology once again, the thicknesses (in the axial direction of the sample portion 16) of the inner retinal layers of the eye 10 can be measured using either or both of the A-scan and the B-scan. The difference between the boundaries of different inner retinal layers appearing in the A-scan(s) or B-scan can be utilized to determine the thickness of the retinal layers described in detail below, for example.

Figures 2, 4:
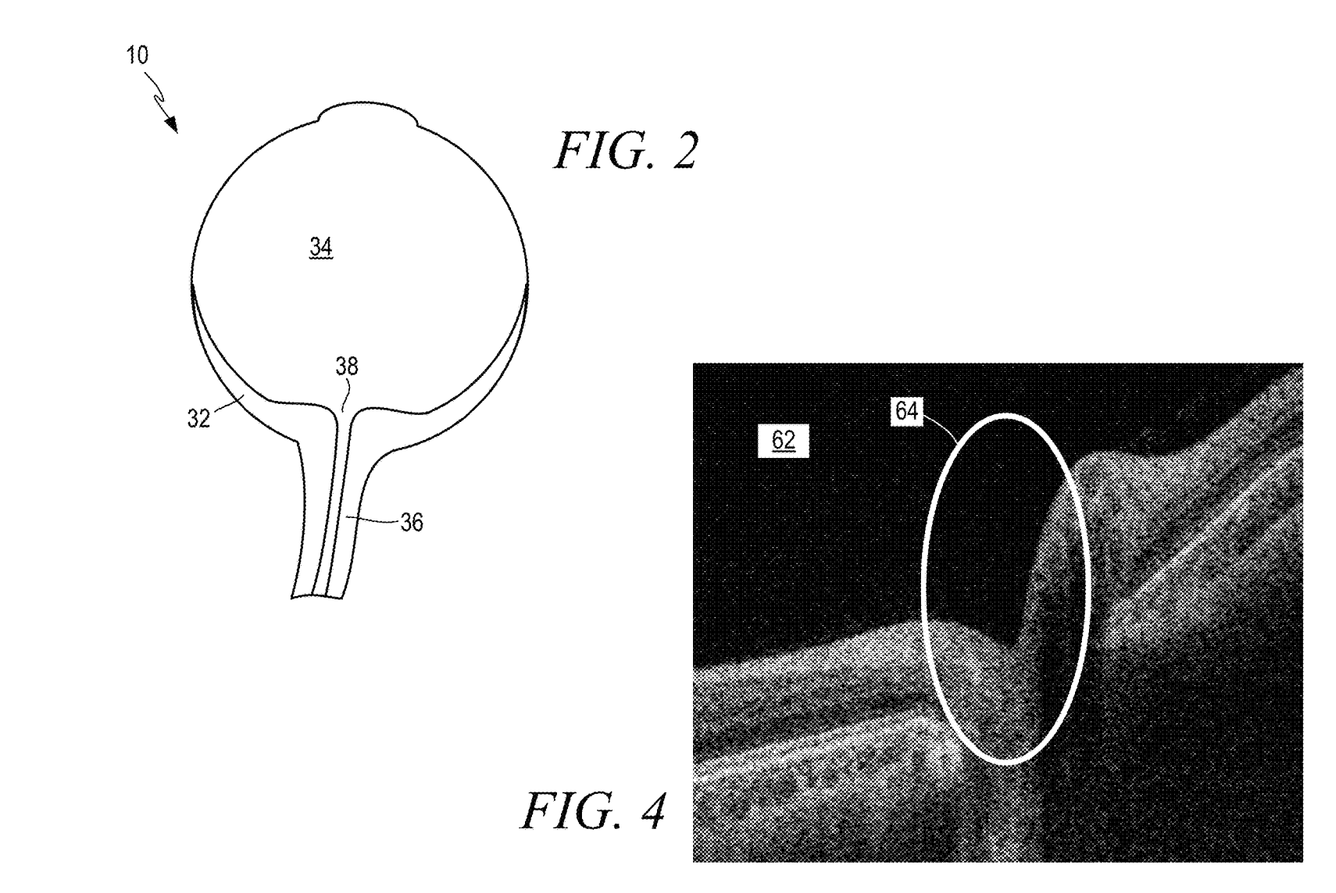
FIG. 2 shows a schematic representation of a human eye.
FIG. 4 shows an illustrative embodiment of an OCT image of a portion of a retina including an ONH cutout region.

FIG. 2 shows a schematic representation of a human eye 10. Of interest for the description of the illustrative embodiment, the retina 32 is a light-sensitive tissue disposed along the rear surface of the eye's interior 34. The retina 32 converts light into electrical signals that are transmitted to the brain through the optic nerve 36, which begins where ganglion cell axons of the retina 32 exit the eye 10 at the ONH 38.

Figure 3:
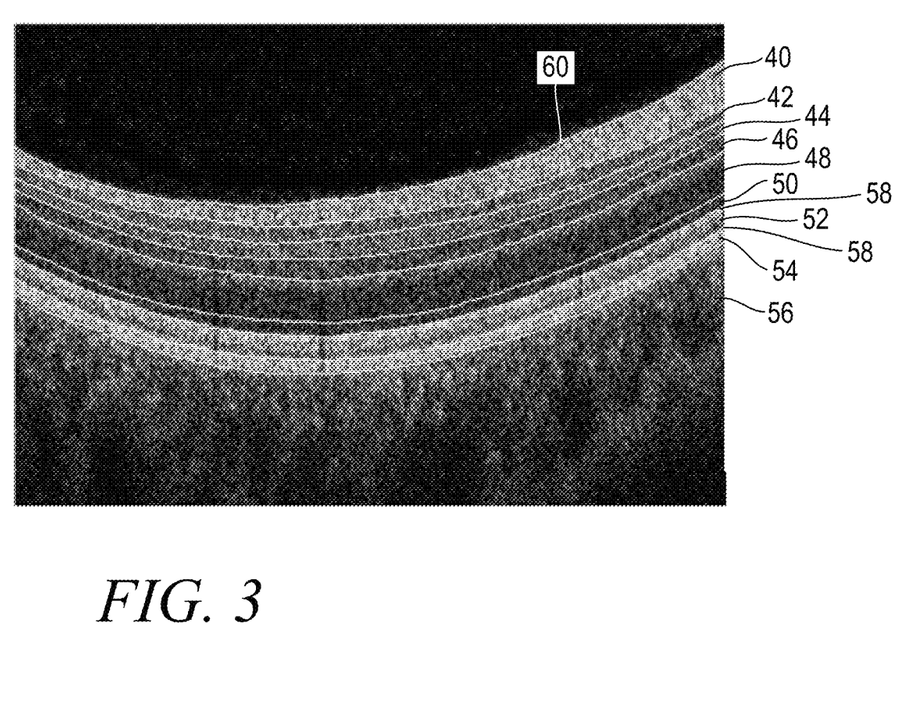
FIG. 3 shows an OCT B-scan image that includes a two-dimensional view of a portion of a retina.

FIG. 3 shows an OCT B-scan image that includes a two-dimensional view of a portion of the retina 32. The retina 32 is a layered structure with several layers of neurons interconnected. Distinguishing a plurality, and optionally each of these layers from each other by establishing their respective boundaries is performed to clinicians to conduct an analysis of the retina 32 in an effort to diagnose and/or monitor medical conditions related to the eye 10. As shown in FIG. 3, the layers of the retina 32 are as follows:

Nerve fiber layer 40,
Ganglion Cell Layer 42,
Inner Plexiform Layer 44,
Inner Nuclear Layer 46,
Outer Plexiform Layer and Outer Nuclear Layer 48,
Inner Segment Layer and Outer Segment Layer 50 and 52,
Retinal Pigment Epithelium 54, and
Choroid 56.

The Outer Plexiform Layer and Outer Nuclear Layer 48 listed above can optionally be segmented from each other and identified as separate layers as discussed below according to alternate embodiments. Optical changes along Henle's Fiber Layer ("HFL") due to the orientation of these fibers can make it difficult to accurately distinguish the border between the Outer Plexiform Layer, HFL fibers and the neighboring layer the Outer Nuclear Layer in an OCT B-scan. This phenomenon can be mitigated by impinging the light from a low-coherence broadband light source 12 through a portion of the pupil where the resulting B-scan takes on a vertically-symmetric appearance. Thus, the boundaries of the collective Outer Plexiform Layer and Outer Nuclear Layer 48 can be located, or the boundaries of each of the separate Outer Plexiform Layer, Outer Nuclear Layer, and HFL can optionally be located separately. For the sake of clarity and brevity, however, the Outer Plexiform Layer and Outer Nuclear Layer 48 are considered collectively, as a single layer.

Boundaries 58, highlighted by lines in FIG. 3 and optionally generated according to the present technology, exist at an interface between each layer and its immediately adjacent layer(s). The internal limiting membrane ("ILM") 60 establishes the innermost boundary of the retina 32. Once the boundaries 58 have been located, the image of the retina 32, for example, can be analyzed to determine the thickness of at least one, a plurality, or each of the layers 40-56 in an effort to diagnose and/or monitor progression of a medical condition relating to the eye 10.

As schematically illustrated in FIG. 2, the ONH 38 forms a cutout region, represented as a depressed area of the retina 32. However, the degree of depression is highly subject-dependent, and will likely vary by patient. In fact, in some subjects there may be no depression at all, or could even appear as a nipple-like external protrusion. For purposes of describing the illustrative embodiments, however, the ONH 38 is described as forming a depression herein. An OCT image 62 of the retina including this cutout region 64, which is circled, is shown in FIG. 4. As shown, the contours of the tissue forming the retina 32 can change drastically in the vicinity of the ONH 38, making it difficult to observe characteristics used to identify the location of the boundaries 58 separating layers of the retina 32. Considering the region of the retina 32 at, and adjacent to the ONH 38 can undesirably affect the identification of the boundary locations, so the region of the retina 32 adjacent to the ONH 38 is excluded from the analysis of the image 62 to identify the layers 40-56 of the retina 32, and the boundaries 58 separating those layers 40-56 from each other.

The quantification of OCT images is described in detail herein as the determination of the layer thickness of one, a plurality, or each of the retinal layers 40-56 for the sake of clearly describing the present technology. However, it is to be understood that the quantification can include other image analyses including, but not limited to, segmentation, cup/disc analysis, tissue attenuation analysis, drusen area/ volume calculation, geographical atrophy area/volume calculation, fluid filled area quantification, and the like.

According to the present embodiment of quantifying an OCT image 62, the image data representing the OCT image 62 is to be processed and a region, such as the cutout region 64 for example, that is to be excluded from the quantification is identified. The OCT image 62 is then divided into at least two, and optionally more portions, including at least the region to be excluded and one or more remaining regions that are to be included in the quantification analysis. At least one, and optionally each such portion can then be subjected to the quantification analysis individually, and optionally combined to form a composite image that has been subjected to the desired quantification.

Although described herein as being excluded from the quantification analysis, the region to be excluded can optionally be excluded entirely from quantification analysis, or subjected to the same, or different, quantification analysis as the one or more remaining region(s), but such quantification is performed separately for each such region. Thus, a quantification analysis performed on the region to be excluded is performed separately from the quantification analysis performed on the remaining region(s). For instance, the quantification analysis of the region to be excluded (e.g., the ONH cutout region 64) can include, but not limited to, at least one of ONH drusen area/volume quantification, fluid filled area/volume quantification, cup/disc analysis, atrophy analysis, lamina cribrosa quantification, blood flow analysis, and the like. Similarly, the one or more remaining region(s) can be subjected to a quantification analysis including, but not limited to, at least one of layer segmentation, layer thickness measurement, tissue attenuation analysis, drusen area/volume quantification, fluid filled area/volume quantification, geographical atrophy area quantification, blood flow analysis, and the like.

Additionally, the region to be excluded is described below as the ONH cutout region 64. However, it is to be understood that any region that could undesirably affect the quantification analysis of the subject of a medical image can be considered the region to be excluded from the quantification analysis.

According to alternate embodiments, if three-dimensional data are available, e.g., an arrangement of a plurality of B-scans, the cutout region 64 or other aspect in the region excluded from the quantification analysis for each of the two-dimensional images can assembled to form an initial estimate of the size of the cutout region 64 for the entire volume. The estimated volume of the cutout region 64, or the border thereof, can optionally be refined utilizing neighboring B-scan information. For example, a plurality of B-scans acquired along parallel, contiguous scan paths can be assembled by the computer 25 to create a three-dimensional dataset. These scan paths can have any desired orientation to allow image data from neighboring B-scans to be utilized to generate the three-dimensional dataset. The orientations of the scan paths can be linear at any arbitrary angle such as vertical and/or horizontal, radial and concentric about the ONH 38 or ONH cutout region 64, etc. . . . According to alternate embodiments, the scan paths can include an arcuate path, or paths of any other desired shape.

Figure 5:
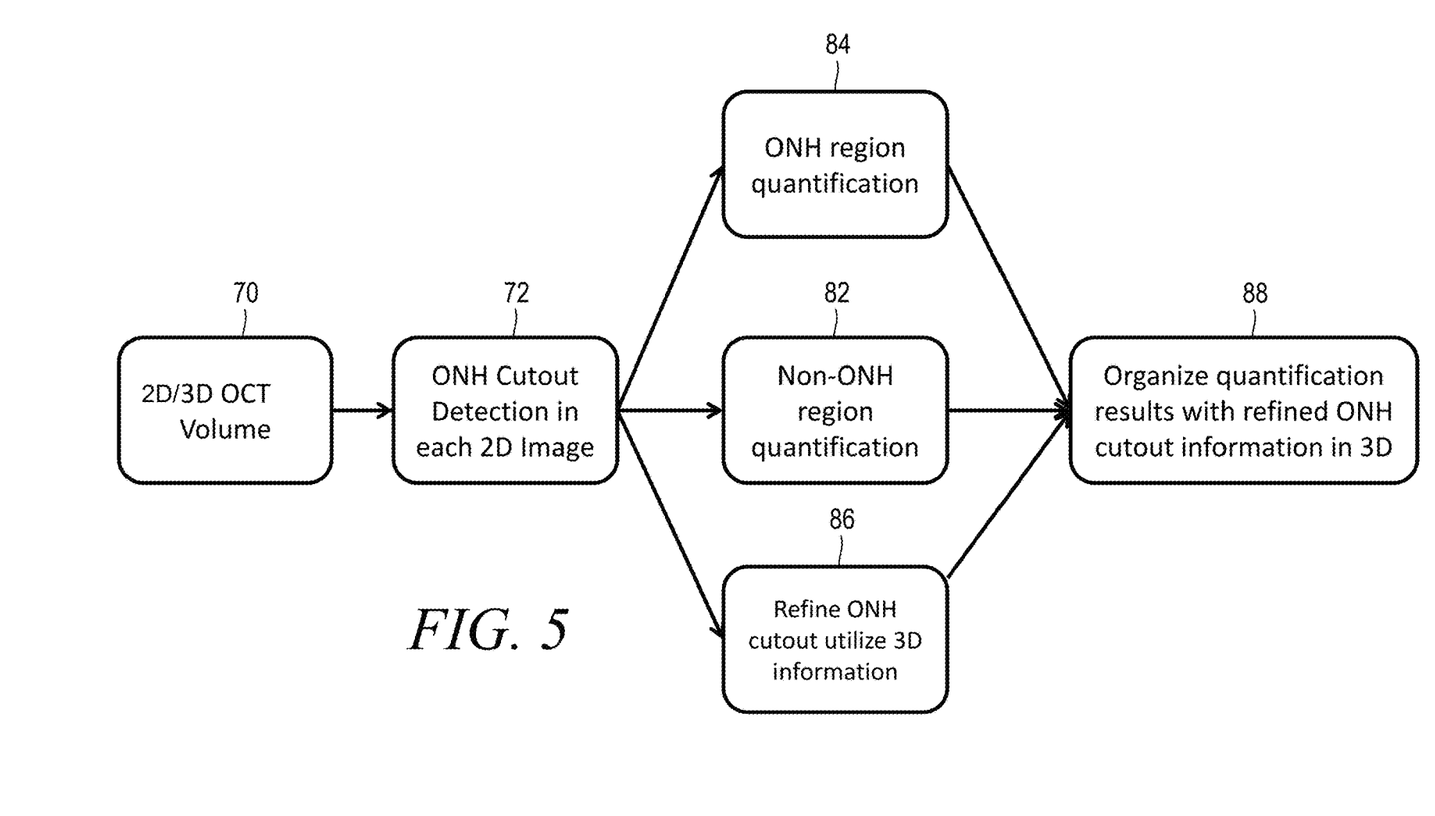
FIG. 5 shows a flow diagram graphically depicting an illustrative embodiment of a method of processing image data and detecting a region of an image represented by the image data to be excluded from an analysis of the image.

More specifically, with reference to FIG. 5, a method of processing OCT image data and detecting a region of an OCT image 62 represented by the image data to be excluded from an analysis of the OCT image 62, includes receiving the image data at step 70. As OCT image data, the image data was captured by an OCT medical modality, but again, other modalities such as MRI, CT scanner, etc. . . . are also included within the scope of the present disclosure. The image data received can be transmitted by the medical modality over a communication network such as a local area network ("LAN") established at a healthcare facility, a wide area network ("WAN") such as the Internet, or a combination of a LAN and a WAN. The image data can optionally also be delivered to a computer terminal including a processing component programmed with computer-executable instructions via a portable computer-readable medium (e.g., CD, DVD, USB flash drive or other non-volatile memory, etc. . . . Regardless of the method of delivery, the OCT image data is received by a computer such as computer terminal 25 (FIG. 1) programmed to carry out the method of processing OCT image data described herein.

The image data received can include at least one, and optionally a plurality of B scans, so that each B scan in a volumetric OCT scan can be quantified, and the region of each B scan to be excluded from quantification scan optionally assembled, after having been identified in the two-dimensional view, into an excluded volume.

Figure 6:
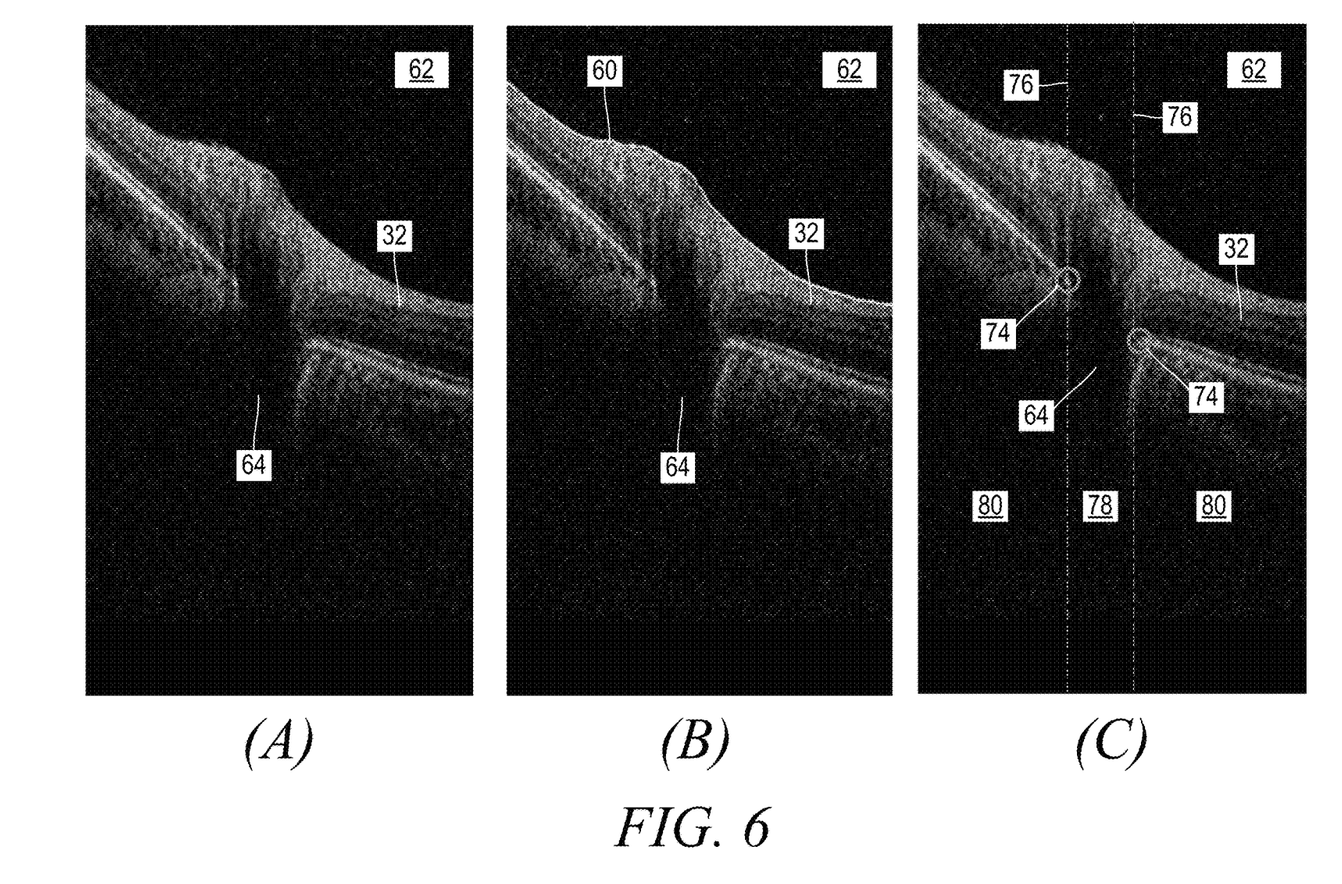
FIG. 6(A) shows an illustrative embodiment of an original OCT image.
FIG. 6(B) shows an illustrative embodiment of the original OCT image appearing in FIG. 6(A) with the ILM highlighted.
FIG. 6(C) shows an illustrative embodiment of the original OCT image appearing in FIG. 6(A) with a pair of cut lines extending through markers that bound opposite lateral sides of the region to be excluded from a quantification analysis performed on two remaining regions.

At step 72, an evaluation of a portion of the image data representing a two-dimensional view (e.g., B scan) of the retina 32 appearing in the OCT image 62 is conducted to locate, in that two-dimensional view, the cutout region 64 to be excluded from the quantification analysis that is to be conducted on a remaining portion of the image. For instance, the brightness and/or color of individual, neighboring or contiguous pixels in the depth direction of the eye 10 can be evaluated to identify distinct gradients to identify the location of landmarks. According to alternate embodiments, predetermined shapes can be identified within the image data to indicate the presence of landmarks. The evaluation performed at step 72 can involve recognition of landmarks that are known to appear in the OCT image 62 being evaluated. As shown in FIG. 6, the original OCT image 62, shown in FIG. 6(A), is analyzed by the computer terminal 25 executing computer-executable instructions stored on a non-transitory computer-readable medium to detect and identify the location of the ILM 60 in FIG. 6(B). The ILM 60 indicates the innermost boundary of the retina 32, and can be recognized based on intensity, color, or other contrast gradients appearing in the OCT image 62 based on the image data. Once detected, the ILM 60 can be highlighted with a line as shown in FIG. 6(B).

In addition to, or instead of detecting the ILM 60, the computer terminal 25 can again detect one or more of the gradients based on the image data to determine the location of the cutout region 64. As shown in FIG. 6(C), two markers 74 denote a substantial gradient between the brightness of a layer of the retina 32 and the cutout region 64, marking the lateral sides of the cutout region 64. The markers could be, but are not limited to Bruch's membrane opening points or the end points of the retinal pigment epithelium ("RPE") for example. Vertical cut lines 76 extend through the markers 74 and span the entire vertical height of the OCT image 62, establishing the width of the region 78 to be excluded from the quantification analysis performed on the remaining regions 80. As shown in FIG. 6(C), the region to be excluded 78 includes the cutout region 64 of the ONH 38, while the remaining regions 80 include substantially uniform and continuous layered segments of the retina 32.

The computer terminal 25 is described above as automatically detecting landmarks such as the ILM 60 and/or the cutout region 64 by recognizing gradients exceeding a predetermined threshold based on the image data. However, alternate embodiments can include a manual selection of one or more landmarks in the image indicating the location of a border or boundary of a region of interest along the retina 32.

At least one of the OCT image 62 and the set of cut lines 76 can optionally be pivoted relative to the other to accommodate an ONH 38 with a cutout region 64 that may not be vertically oriented as shown in FIG. 6(C).

Figure 7:
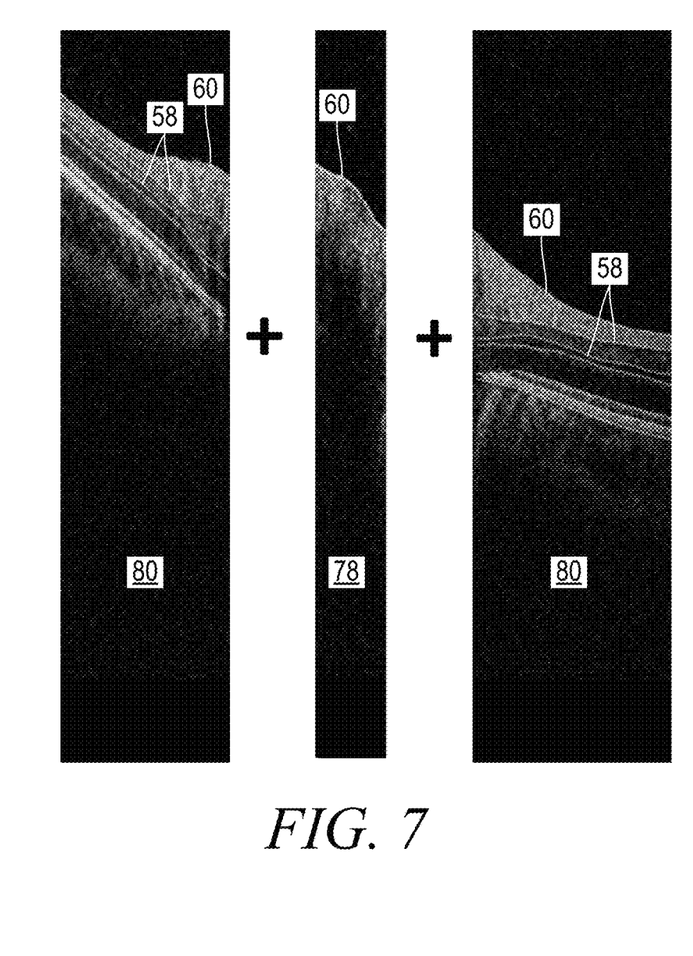
FIG. 7 shows an illustrative embodiment of remaining portions of an OCT image separated from a region to be excluded, where a pertinent feature detected as part of a quantification analysis includes a boundary separating each of a plurality of retinal layers in the remaining portions, and optionally an ILM in the region to be excluded.

With the region to be excluded 78 distinguished from the remaining regions 80 in FIG. 6(C), the quantification analysis desired can be performed on the remaining regions 80 at step 82 in FIG. 5. Similarly, the same, or a different quantification analysis than that performed on the remaining regions 80 can optionally be performed on the region to be excluded 78 at step 84. Alternately, the region to be excluded 78 can be excluded from a quantification analysis entirely. The quantification analysis executed by the computer terminal 25 involves the detection of a feature pertinent to the analysis appearing in the one or more remaining portions 78 of the OCT image 62 outside of the region to be excluded 78. For example, FIG. 7 shows an illustrative embodiment of the remaining portions 80 separated from the region to be excluded 78. The pertinent feature detected as part of the quantification analysis performed on the remaining regions 80 included the boundary 58 separating each of the retinal layers 40-56 (FIG. 3), along with the ILM 60. Thus, according to the present embodiment, the region to be excluded 78 is identified, and then the quantification analysis is performed on the remaining regions 80. In this manner, the quantification analysis can optionally not be performed on the region to be excluded 78 at all. For other embodiments, if the quantification analysis is performed on the region to be excluded 78, the result of any such quantification analysis can be excluded from consideration, afforded a lesser, or insignificant weight relative to the weight afforded the results for the remaining regions 80, or otherwise considered differently than the result of the quantification analysis performed on the remaining regions 80.

Yet other embodiments can optionally consider the results of the quantification analysis performed on the region to be excluded 78 and the one or more remaining regions 80, the same or differently, but the quantification analysis actually performed on each such region can optionally differ. Regardless of the embodiment, the cutout region 64 is identified as forming part of the region to be excluded 78 so the detrimental effects of that region 78 on the quantification analysis performed on the remaining regions 80 can be minimized.

As shown in FIG. 7, the ILM 60 has also been detected as a pertinent feature in the region to be excluded 78.

Figure 8:
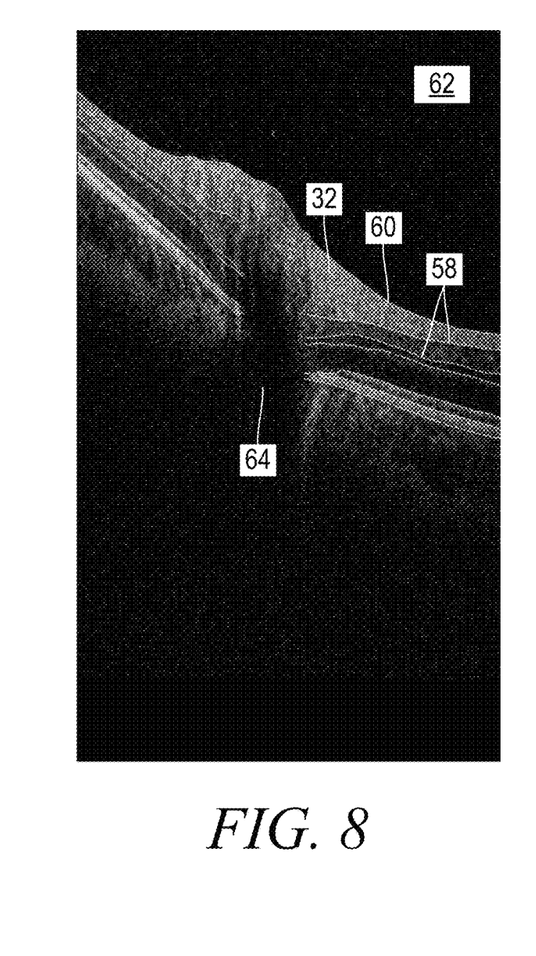
FIG. 8 shows an illustrative embodiment of a display generated by a computer to be presented to a user, the display including a feature pertinent to a quantification analysis, an artifact identifying the feature, and a region to be excluded from the quantification analysis collectively assembled into a single image.

FIG. 8 shows an illustrative embodiment of a display generated by the computer terminal 25 to be presented to a clinician, optionally for diagnostic purposes. The display includes the feature pertinent to a quantification analysis (i.e., the boundaries 58), an artifact identifying the feature (e.g., lines overlaid by the computer terminal 25 on the OCT image 62 denoting the boundaries 58), in combination with the region to be excluded 78, collectively assembled into a single OCT image 62. The lines denoting the boundaries 58 in FIG. 8 may have been placed at different locations than those appearing in FIG. 8 if not for considering the region to be excluded 78 separately from the remaining regions 80.

After the quantification analysis process has been completed for each a two-dimensional B scan, a location of the region to be excluded 78 can optionally be refined at step 86 (FIG. 5) by evaluating additional image data representing another two-dimensional B scan of the retina 32 in a similar manner. The two-dimensional view and the additional two-dimensional view of the retina 32 can optionally constitute sectional views of the retina 32 in contiguous planes. The estimated volume to be excluded can be evaluated to account for any outlying calculations based on the two-dimensional B scans, without refinement based on the three-dimensional data. According to other embodiments, the estimated volume to be excluded can be evaluated to determine a refined angular orientation of the cutout region 64 appearing in one or more of the OCT images 62. Thus, based on this evaluation of the three-dimensional data, at least one of the shape and size of the region to be excluded 78 in one or more of the individual OCT images 62 can be adjusted from the shape and/or size determined based solely on the two-dimensional B scan as described above.

Figure 9:
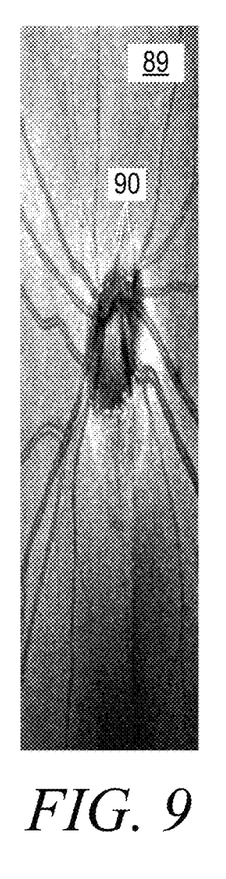
FIG. 9 shows an illustrative embodiment of points acquired from each of a plurality of two-dimensional B scans indicating a location of a cutout region shown on an OCT fundus map.
Figure 10:
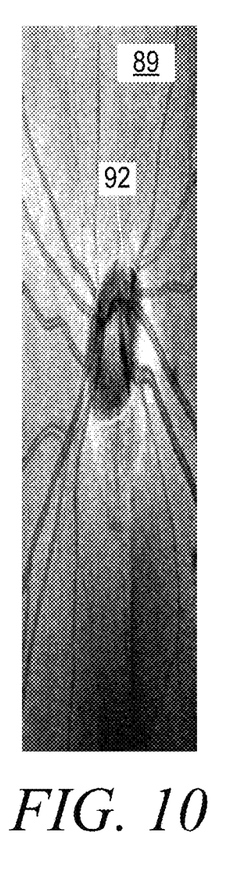
FIG. 10 shows an illustrative embodiment of a trend line representation of a distribution of points acquired from each of a plurality of two-dimensional B scans indicating a location of a cutout region shown on an OCT fundus map.

The regions to be excluded 78 from each of the B scans, determined as described above, can optionally be arranged to establish a volume of the region to be excluded. Points 90 indicating the region to be excluded 78 for each B scan can be arranged in a three-dimensional representation such as a fundus map 89 as shown in FIG. 9. The individual points may have a standard deviation that causes the points 90 to appear scattered to an extent that is not suitable for the intended use of the fundus map. To provide a generalized, "best-fit" representation of the point 90 distribution, a Gaussian filter can be used to create a smooth trend line 92, shown in FIG. 10, identifying the location of the points 90 with a standard deviation, as well as the end points collected from of a plurality of sequential B-scans. According to alternate embodiments, smoothing methods or outlier removal methods other than a Gaussian filter, such as median filter, convex hull, curve fitting and regression can be used in addition to, or instead of the Gaussian filter to generate the trend line representation of the point 90 distribution. However, any desired correction, smoothing, filtering, or other optimization processing techniques can be utilized, involving a one, two or three-dimensional dataset without departing from the scope of the present disclosure. For instance, the smoothing or fitting can be done using either two or three-dimensional representation of the distribution of points 90. In the case of a three-dimensional representation, a reference plane in the three-dimensional representation of points 90 can be fitted, which can be utilized to detect the orientation of the ONH 38. For such embodiments, the three-dimensional estimation of the ONH 38 orientation can allow for an enhanced location and orientation of the markers 74 described above.

Figure 11:
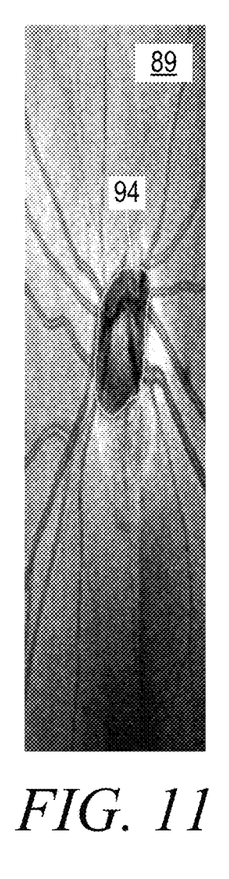
FIG. 11 shows an illustrative embodiment of a boundary of a disc area based on points acquired from each of a plurality of two-dimensional B scans indicating a location of a cutout region shown on an OCT fundus map.

The estimated volume of the entire excluded region can also be utilized to estimate the location of a central region, and optionally the radius, of the ONH 38 on the fundus map 89. For such embodiments, the fundus map 89 is converted from a Cartesian coordinate system to Polar/Elliptical coordinates. The circular structure of the ONH 38 is converted to a linear structure, thus a path search or graph search method can be used to find the accurate boundary of the ONH area in Polar/Elliptical coordinates. Once the accurate boundary 94 of the ONH 38 has been determined, the coordinate system is converted back to Cartesian coordinates, resulting in the fundus map 89 appearing in FIG. 11, including a substantially accurate boundary 94.

The OCT image 62, including one or more of the refinements above, can be displayed to the clinician by the computer terminal 25 at step 88 (FIG. 5). Such a display can be substantially similar to that appearing in FIG. 8, but with the refined data (e.g., updated boundary 58 locations, shape of cutout region 64. etc. . . . ) rather than with the data determined based on the two-dimensional B scans without refinement based on three-dimensional data.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of segmenting image data, the method comprising:
   locating, in a first B-scan of a subject, a first region that includes a structural element and a second region that does not include the structural element;
   detecting a layer boundary at least in the second region but not the first region of the first B-scan; and
   subsequent to detecting a layer boundary, refining a location of the first region by conducting an evaluation of a second B-scan of the subject,
   wherein the first B-scan and the second B-scan of the subject:
   each represent a subset of image data of the subject captured by a medical imaging modality,
   are each two dimensional views that include an axial dimension of the image data, and
   are in adjacent planes,
   wherein the first region and the second region of the first B-scan do not overlap in any dimension other than the axial dimension, and
   wherein the first region and the second region are located only in B-scans of the subject, and the layer boundary is detected only in B-scans of the subject, the B-scans of the subject including the first B-scan and the second B-scan.

2. The method of claim 1, further comprising:
   locating, in the first B-scan, a third region that does not include the structural element and that is discontinuous with the second region, wherein the layer boundary is independently detected in the second region and the third region, but is not detected in the first region.

3. The method of claim 2, wherein the image data of the subject comprises a portion of a retina and the first region comprises a portion of an optic nerve head.

4. The method of claim 1, wherein the image data of the subject comprises a portion of a retina and the first region comprises a portion of an optic nerve head.

5. The method of claim 1 further comprising:
   generating a display comprising an indication of the detected layer boundary, and the first region.

6. The method of claim 1, wherein said refining comprises:
   identifying a plurality of points along a boundary of the first region; and
   establishing a boundary line having a smoothed fit extending between the plurality of points.

7. The method of claim 1, wherein said refining comprises:
   evaluating an orientation of the first region; and
   in response to said evaluating, adjusting the orientation of at least one of the first region and the layer boundary appearing in the remaining portion of the first B-scan.

8. The method of claim 2, wherein the layer boundary spans the second region and the third region.

9. The method of claim 2, wherein the first region and the second region span the entire axial dimension of the first B-scan.

10. A method of segmenting image data, the method comprising:
    locating, in a first B-scan of a subject, a first region that includes a structural element and a second region that does not include the structural element; and
    detecting a layer boundary at least in the second region but not the first region of the first B-scan, wherein:
    said locating the first region comprises identifying a boundary of the first region by locating a discontinuity in the layer boundary or another layer boundary,
    the B-scan represents image data of the subject captured by a medical imaging modality and includes an axial dimension of the image data,
    the first region and the second region of the two-dimensional view do not overlap in any dimension other than the axial dimension,
    the first region and the second region are located only in B-scans of the subject, and the layer boundary is detected only in B-scans of the subject, the B-scans of the subject including the first B-scan.

11. The method of claim 10, further comprising:
    locating, in the first B-scan, a third region that does not include the structural element and that is discontinuous with the second region, wherein the layer boundary is independently detected in the second region and the third region, but is not detected in the first region.

12. The method of claim 11, wherein the image data of the subject comprises a portion of a retina and the first region comprises a portion of an optic nerve head.

13. The method of claim 11, wherein the layer boundary spans the second region and the third region.

14. The method of claim 11, wherein the first region and the second region span the entire axial dimension of the first B-scan.

15. The method of claim 10, wherein the image data of the subject comprises a portion of a retina and the first region comprises a portion of an optic nerve head.

16. The method of claim 10, further comprising:
    generating a display comprising an indication of the detected layer boundary, and the first region.

* * * * *